June 8, 1937. B. PRATT ET AL 2,083,088
VALVE STRUCTURE AND VALVE ASSEMBLY
Filed Sept. 9, 1935 2 Sheets-Sheet 1
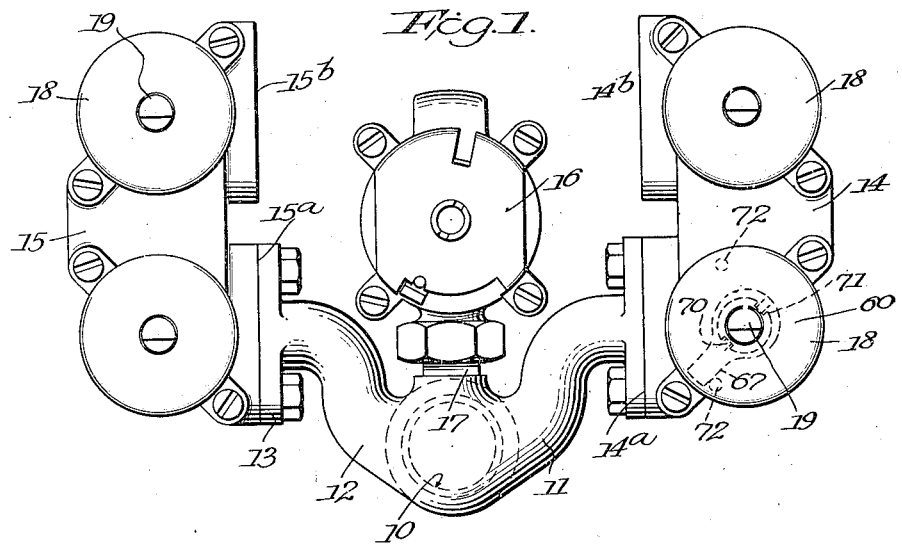
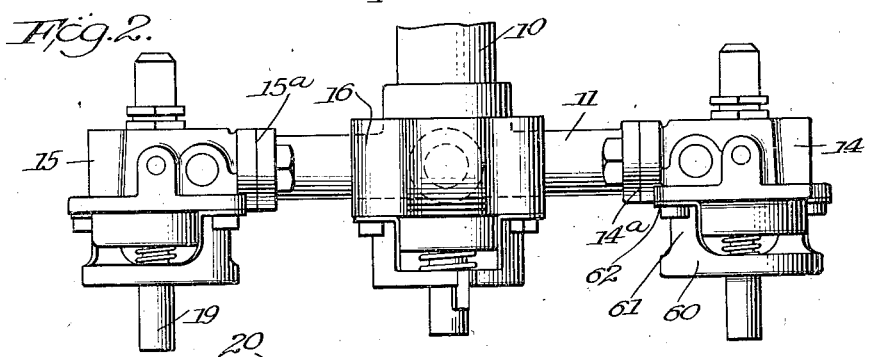
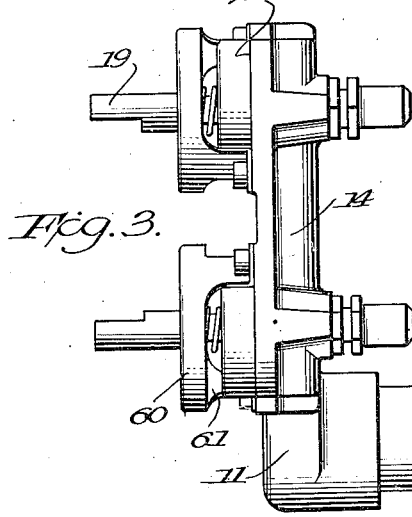
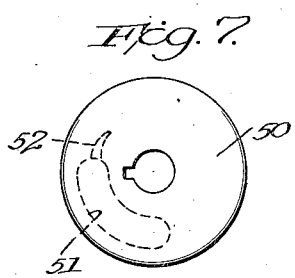
Inventor
Best Pratt,
George F. Weinreich,
By Cushman Darby & Cushman
Attorneys June 8, 1937.  B. PRATT ET AL  2,083,088
VALVE STRUCTURE AND VALVE ASSEMBLY
Filed Sept. 9, 1935  2 Sheets-Sheet 2
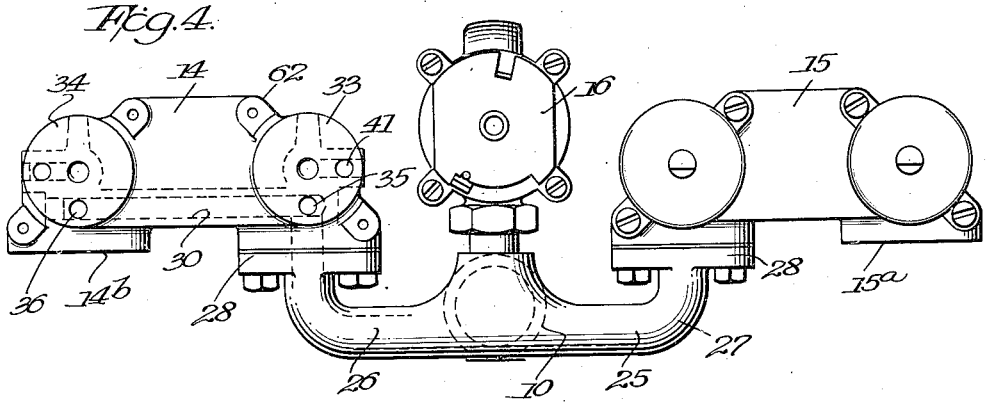
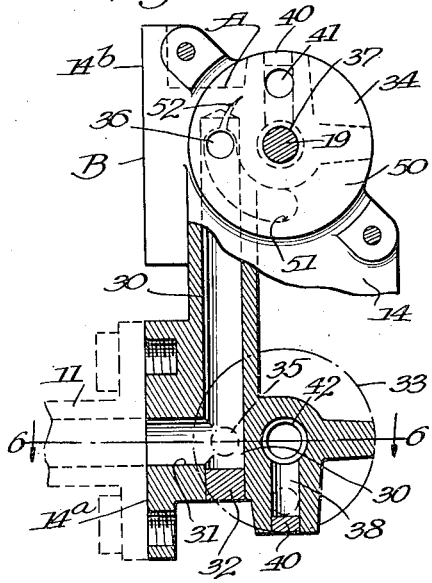
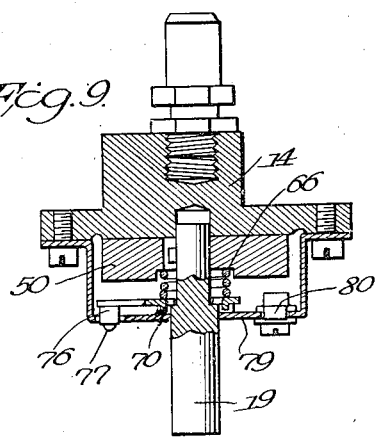
Inventor
Best Pratt
George F. Weinreich
By
Attorneys Patented June 8, 1937

2,083,088

UNITED STATES PATENT OFFICE 2,083,088

VALVE STRUCTURE AND VALVE ASSEMBLY

Best Pratt and George F. Weinreich, Chicago, Ill., assignors to Brake Equipment & Supply Co., Chicago, Ill., a corporation of Illinois Application September 9, 1935, Serial No. 39,818

4 Claims. (Cl. 277—59)

The present invention relates to a valve structure and valve assembly for use with gas ranges.

The principal objects of the invention are to provide a valve structure and assembly which will permit the flow of gas or other fluid to be finely adjusted and which may be readily and economically manufactured and applied to various forms of gas ranges. Another important object of the invention is to provide a valve structure including a valve body having a plurality of valve seats thereon, and which may be interchangeably used in various forms of valve assemblies.

Other objects and advantages of the invention will be apparent from the following specification and drawings wherein Figure 1 is a front view of a valve assembly;

Figure 2 is a plan view of the assembly of Figure 1;

Figure 3 is a side view of the Figure 1 assembly;

Figure 4 is a front view of a modified valve assembly;

Figure 5 is a front view of a valve structure of our invention, the view being partly in section;

Figure 6 is a sectional view on the line 6—6 of Figure 5;

Figure 7 is a front view of a valve element;

Figure 8 is a fragmentary front view showing a form of stop arm for the valve operating shaft; and Figure 9 is a sectional view taken on the line 9—9 of Figure 8.

The numeral 10 indicates a range gas supply pipe of the type which extends through the burner box of the range to a point adjacent its front wall. Referring to Figures 1 to 3, a manifold element or yoke 11 forming a part of our valve assembly is suitably connected to the front end of the gas supply pipe 10. As is best shown in Figure 1, the manifold element includes two upwardly and outwardly curved arms 12 provided with vertically disposed flanges 13. Valve body members 14 and 15 forming part of our valve structure are secured to the flanges 13, preferably by means of bolts extending through apertures in the flanges and threaded into bores in the contacting side faces 14a and 15a, respectively, of the valve body members.

An oven control valve indicated by the numeral 16 and of the type disclosed in our Valve structure application Serial No. 22,746, filed May 20, 1935, is connected to the manifold 11 to receive gas therefrom, the valve 16 being connected to the manifold by a tube 17 threaded into the upper and central portion of the manifold.

Each valve body member 14 and 15 is provided with two cooperating valve elements generally indicated by the numeral 18 and including valve operating shafts 19. By the arrangement disclosed in Figures 1 to 3, wherein the valve body elements extend vertically with respect to the manifold element 11, the four valves controlling the top burners of the range will be grouped substantially at the corners of a rectangle and the oven control valve 16 will be centrally positioned with regard to the top burner valves. It will be understood that the ends of the valve operating stems 19, as well as the operating stem of the oven control valve, will be provided with knobs or handles positioned thereon in front of the front cover plate of the range. The detailed construction of the valve body members 14 and 15 will be hereinafter described.

Referring to Figure 4, wherein a modified arrangement of the valve body elements is illustrated, the structure disclosed therein includes a manifold element 25 formed of two arms 26 and 27 having their free ends curved upwardly and each provided with a horizontally arranged flange 28. Valve body elements 14 and 15 are secured to these flanges by the same means as has been described above in connection with Figures 1 to 3, but the valve body elements extend horizontally in Figure 4 instead of vertically as in Figures 1 to 3. By this arrangement, all of the valves of the range are in a substantially straight line, the oven control valve 16 being connected to the manifold 25 above its central portion so that it will be arranged substantially in the line of the other valves.

It will be understood that the oven control valve 16 need not be connected to the manifold elements of Figures 1 and 4 and that valves of other types than oven valves may be connected to the manifold element.

Figure 5 shows a valve body element in detail, the element illustrated being that indicated by the numeral 14 and which is connected to the right hand end of the Figure 1 assembly and to the left hand end of the Figure 4 assembly. The valve body element of the type indicated in Figures 1 to 4 by the numeral 15 is formed from the same casting as is type 14, but, as will be hereinafter specifically described, is provided with a different flow passage arrangement. As is indicated in Figures 2, 3 and 5, the valve body is substantially of the form of a right-angled plate, including a front or seat face on which valve seats are formed, and a side face including flat abutment faces 14a and 14b. Element 14 is provided with a longitudinally extending passage or bore 30 having a short transverse passage 31 communicating with one end thereof from the abutment face 14a and through which gas may flow from the adjacent end of the manifold 11 when the element is assembled. As will be clear from Figure 5, the passages 30 and 31 may be drilled to intersect, the open end of passage 30 being then closed by a plug 32. It will be noted that the abutment face 14b is left blank.

A valve seat 33 of planar form is provided on the seat face of element 14 adjacent the abutment face 14a and a second valve seat 34 is provided at the opposite end thereof and opposite abutment face 14b. Both valve seats are of planar form, lie in the same plane and include supply ports 35 and 36 respectively opening thereto from the longitudinal passage 30. Each valve seat also includes a socket 37 centrally positioned therein to receive the inner end of a valve operating shaft 19. An outlet passage 38 is also formed in each seat face, these passages extending in diametrically opposite directions from the centers of the valve seats with which they are respectively associated, preferably parallel with the passage 30, and being drilled, the outer ends of the passages then being closed by plugs 40. The outlet passages 38 communicate with the valve seats through ports 41 and, in the present embodiment of our invention, extend to a point in alignment and behind the operating shaft socket 37, where they open to an axial port 42 which is threaded to receive a nipple 43 through which the gas may flow to a Venturi tube.

A valve element 50 of disk form is positioned upon each seat face 33 and 34, this element being provided with an arcuate groove 51 having rounded ends, a shorter and shallower tapered groove 52 extending from one end of groove 51. The construction of the valve element and its relation to the supply and outlet ports of the valve seat is shown in Figure 7 and in dotted lines in Figure 5 and is the same as described in our patent for Rotary disk valve No. 2,061,716, issued November 24, 1936, and may be sufficiently described for the purposes of the present application as follows:—

The supply port and outlet ports of each valve seat are substantially 90° apart, and the valve element passage or groove 51 is of a length to bridge the valve seat ports when the valve element 50 is in position for full flow. On valve seat 34 in closed position, the end of the passage 51 having the tapered passage 52 extending therefrom is opposite the supply port and clockwise rotation of the valve element will cause the tapered passage 52 to move opposite the outlet passage to permit of a reduced flow to the burner. If rotation of the valve element 50 is continued, a full flow will be had. It will be noted that the operation of the valve element on valve seat 33 is the same as that on seat 34 except that it would be rotated in a counter-clockwise direction from closed to open position.

The valve body element 15 is identical with the element 14 illustrated except that the longitudinal supply passage 30 would be drilled into the same from the end indicated by the letter A and that end would then be closed by a plug such as 32. Also, in the element 15, the transverse passage 31 would be drilled in at point B, in the abutment face 15b, abutment face 15a being left blank. It will thus be obvious that the element 15 will be formed so that its supply end may be attached to the left hand end of the Figure 1 assembly and the right hand end of the Figure 4 assembly.

Each valve seat of each of the elements 14 and 15 has a front plate 60 secured opposite the same, the front plate 60 being circular in form and including inwardly extending ears 61 having their ends turned outwardly as indicated at 62 so that screws may be passed through the same to secure the plates to the valve body elements. Each plate 60 is provided with a central aperture 63 through which the outer end of the corresponding valve operating shaft 19 extends. The inner end of the valve operating shaft is positioned in the socket 37 and the shaft is provided with a key 64 arranged to extend into a key-way 65 in the valve element 50 controlled by the shaft. A spring 66 about the valve shaft 19 has its inner end bearing in a countersink in the outer face of the valve element 50 and its outer end bearing upon a stop arm 67 to hold the latter against an annular shoulder 68 formed integral with the valve shaft. The spring thereby holds the valve shaft outwardly with its shoulder 68 against the inner surface of plate 60 and holds the valve element 50 in contact with the valve seat of the valve body. As best shown in Figures 6 and 1, the stop arm 67 is provided with struck-out tangs 70 which extend into notches 71 in the shoulder 68 to key the stop arm to the valve shaft. The opposed surfaces of the struck-out tangs 70 are so formed that they will closely contact with the inner surface of the notches 71, with the result that the stop arm 67 will not tilt with respect to the valve shaft 19. Pins 72 extend inwardly from the plate 60 to serve as stops as indicated in Figure 1, thereby limiting the rotation of the valve shaft and valve element between closed and fully opened positions of the valve element.

In Figures 8 and 9, a modified form of stop arm and cooperating plate is shown, wherein the stop arm 75 is provided at its free end with a block 76 having a hemispherical projection 77 on its outer face. The stop arm cooperates with a stop pin 78 fixed to the inner face of plate 79 and with a stop member 80 adjustably secured in an arcuate slot 81 in the plate by means of a screw 82, this arrangement permitting the turning movement of the stop arm 75 to be adjusted. A large aperture 83 is provided in the plate 79 opposite the point at which arm 75 will be positioned when the valve is in closed position, the block 76 being then positioned in the aperture to so lock the valve element in closed position that it may only be moved toward open position after inward movement of valve shaft 19 and stop arm 75 against the action of the spring 66. Inward movement of the shaft will be possible because, as shown in Figure 9, its inner end is not ordinarily in contact with the inner end of the bore 37 in a valve seat. The close fit of the tangs 70 in the slots 71 of valve shaft shoulder 68 will cause the stop arm to move straight back with the shaft and without tilting.

The plate 79 may be provided with one or more additional apertures 85 spaced in the path of movement of block 76, but these apertures are only large enough to receive the hemispherical projection 77 and will merely cause a clicking sound to be made by the stop arm when the valve is in the position intended to be indicated by an aperture 85.

It will be observed that the assembly of the valve shaft 19 between the plate 60 or 79 and the valve body will permit the valves to be readily removed for cleaning.

It will also be appreciated that the valve assemblies of the present invention provide a structure whereby gas range valves may be securely supported in proper position with a minimum amount of piping. Furthermore, the valve bodies 14 and 15 may each be formed from identical castings, and are interchangeable for use upon different types of manifold elements.

It will be understood that the invention is not limited to the details of construction shown in the drawings and described in the specification and that the example of the use of the device which has been given does not include all of the uses of which the device is capable; also, that the phraseology employed in the specification is for the purpose of description and not of limitation.

We claim:—

1. As an article of manufacture, a gas range valve body having two exterior walls at right angles to each other, one of the walls being provided with valve seats and the other wall being adapted to abut against the end of a gas supply pipe to which the valve body is connected, there being a supply passage in the valve body adapted to communicate with the gas supply pipe and communicating with the valve seats, and outlet passages each communicating with a valve seat and adapted to be connected to a burner.

2. As an article of manufacture, a gas range valve body having two exterior walls at right angles to each other, one of the walls being provided with valve seats and the other wall being adapted to abut against the end of a gas supply pipe to which the valve body is connected, there being a supply passage in the valve body adapted to communicate with the gas supply pipe and communicating with the valve seats, and outlet passages each communicating with a valve seat and adapted to be connected to a burner, and outlet fittings extending at right angles to the wall bearing the seat faces.

3. As an article of manufacture, a gas range valve body having two exterior walls at right angles to each other, one of the walls being provided with valve seats, there being a supply passage in the body communicating with each valve seat, the other wall being provided with faces adapted to be selectively drilled to connect the supply passage to a supply conduit.

4. A valve assembly for gas ranges comprising a manifold element adapted to be connected to a gas supply pipe, the manifold element having laterally extending arms, valve structures carried by the arms, the valve structures each being provided with a plurality of valve seats and a supply passage communicating with the manifold element and with each valve seat, there being outlet passages extending from each valve seat, and a valve element upon each seat to control the flow of gas therethrough.

BEST PRATT.
GEORGE F. WEINREICH.